Jan. 5, 1965    H. D. TERHUNE    3,164,026
TRANSMISSION BELT AND METHOD OF MANUFACTURE
Filed Oct. 3, 1962    2 Sheets-Sheet 1

INVENTOR.
HUGH. D. TERHUNE
BY
Reuben Wolk
ATTORNEY

Jan. 5, 1965  H. D. TERHUNE  3,164,026
TRANSMISSION BELT AND METHOD OF MANUFACTURE
Filed Oct. 3, 1962  2 Sheets-Sheet 2

INVENTOR.
HUGH D. TERHUNE
BY
Reuben Wolk
ATTORNEY

United States Patent Office 3,164,026
Patented Jan. 5, 1965

3,164,026
TRANSMISSION BELT AND METHOD OF MANUFACTURE
Hugh D. Terhune, Springfield, Mo., assignor to Dayco Corporation, Dayton, Ohio, a corporation of Ohio
Filed Oct. 3, 1962, Ser. No. 228,109
8 Claims. (Cl. 74—233)

This invention relates to an improved transmission belt and method of manufacture, particularly V-type belts.

It is well known that transmission belts are utilized for transferring power from a driving pulley to a driven pulley by passing the belt in a continuous manner around the pulleys. The conventional transmission belt has its inner section placed in compression while its outer section is placed in tension and separated from the compression section by a neutral section having reinforcing means therein, and an outer cover. Such a transmission belt is normally manufactured by concentrically assembling these sections, cutting them into belt bodies and vulcanizing them to form an integral structure. One method of vulcanizing consists of placing the belt bodies in an open mold cavity and applying heat and pressure, usually hydraulically.

This prior art method results in belts that often require trimming. In some instances the inner surfaces tend to crack, and the scrap rate of these belts is fairly high. Further, these methods require relatively close tolerances to produce a satisfactory belt and an expensive hydraulic press is required in the process. However, according to the teachings of this invention an improved method is provided for forming such transmission belts without the above disadvantages. In particular, one feature of this invention involves cure of the belt body in such a manner that the internal pressure or force is created inside the body to tend to stretch the cover whereby the belt is cured with internal forces and not with external forces as in the past.

Accordingly, it is an object of this invention to provide an improved transmission belt having one or more of the novel features of this invention as set forth above or hereinafter shown or described.

Another object of this invention is to provide an improved method for making such a transmission belt or the like.

Other objects, uses and advantages of this invention are apparent from a reading of this description which proceeds with reference to the accompanying drawings forming a part thereof and wherein.

Figure 1:
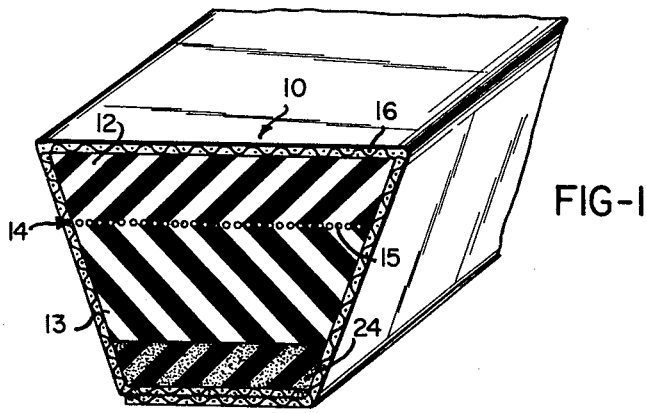
FIGURE 1 is a perspective view in partial cross section, illustrating a typical transmission belt that can be manufactured by the teachings of this invention.

While the various features of this invention are hereinafter described and illustrated as being particularly adaptable for making transmission belts, it is to be understood that the various features of this invention can be utilized singly or in any combination thereof to provide other structures as desired. Therefore, this invention is not to be limited to only the embodiments illustrated in the drawings, because the drawings are merely utilized to illustrate the preferred form of the invention.

Referring now to FIGURE 1, an improved V-type transmission belt of this invention is designated by the reference numeral 10. The features of this invention, however, can be utilized to form transmission belts having other desired configurations which are well known in the art. The belt has an outer or tension section 12 and an inner or compression section 13, both made of an elastomeric material such as natural or synthetic rubber. The tension section 12 is separated from the compression section 13 by a neutral axis or strength section 14 which consists of reinforcing rods 15 of a textile material, wire, or other relatively inextensible material. This entire assembly is surrounded by an outer stretchable cover or wrap 16 made of a woven fabric which may be impregnated with rubber.

Figure 4:
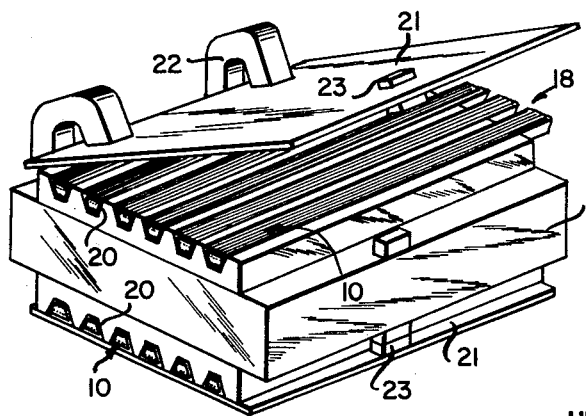
FIGURE 4 is a perspective view illustrating one form of an apparatus that can be utilized to practice this invention.

Referring now to FIGURE 4, an improved apparatus 18 of this invention is provided and comprises a mold section 19 having the opposed surfaces thereof provided with longitudinally disposed mold cavities 20 having the desired cross-sectional configurations for forming the transmission belts 10. A pair of closure plates 21 are respectively hingedly secured to the mold section 19 by hinges 22 and are adapted to close the open ends of the mold cavities 20 and be latched in the closed position to the mold section 19 by suitable latch structure 23. The middle or mold section 19 of the apparatus 18 is adapted to be heated in any suitable manner, such as by steam or the like, to sufficiently heat the transmission belts 10 disposed in the mold cavities 20 thereof to cause curing of the material 17 in a manner hereinafter described. A more detailed description of the apparatus may be found in United States Patent No. 2,602,188, with reference to the heating methods involved.

Referring again to the structure of the belt body 10, at least a portion 24 of the compression section 13 has a blowing agent 17 disposed therein during the milling operation to cause the portion 24 to expand during the curing operation to create an internal force inside the body to stretch the cover 16 in a manner hereinafter described. The blowing agent can be any suitable material, such as ammonium bicarbonate, ammonium carbonate, sodium bicarbonate sodium carbonate and diazo amino benzene. However, this invention is not to be limited to any particular blowing agent.

Figure 2:
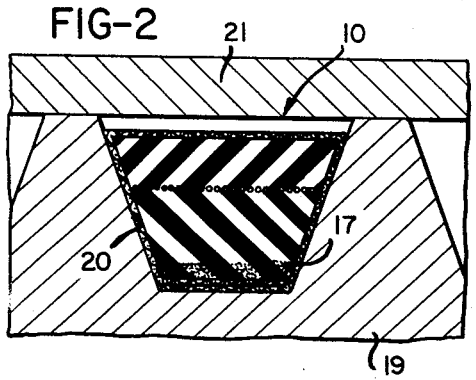
FIGURE 2 is an enlarged, fragmentary cross-sectional view illustrating one step in the method of forming the transmission belt of this invention.
Figure 3:
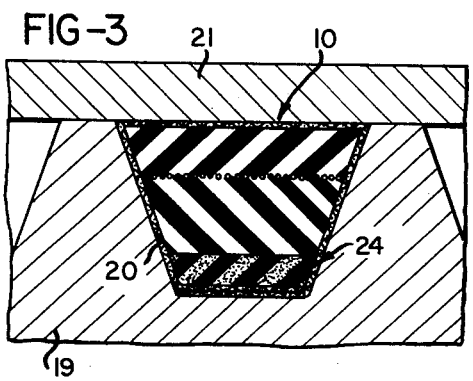
FIGURE 3 is a view similar to FIGURE 2 illustrating another step in the method of this invention.

As illustrated in FIGURE 2, it can be seen that the cover 16 of the belt prior to the curing operation does not completely fill the mold cavity 20 even though the closure plate 21 is disposed in its closed position. However, during the heating of the transmission belt 10 by the apparatus 18, the blowing agent 17 expands and creates a section 24 of blown elastomeric material such as sponge rubber, and at the same time stretches the cover to substantially fill the mold cavity 20. The curing of the body simultaneously takes place while the transmission belt 10 is under internal pressure, rather than external pressure, as in the prior art methods. The expansion forces the exterior of the belt body against the mold cavity and the top of the retaining plate, and the extent of the pressure is controlled by the amount of blowing agent incorporated therein.

It has been found that when the transmission belts 10 are formed in the above manner, they do not require trimming because the belts 10 are all uniformly formed in the mold cavities 20; the belt building tolerances can be more liberal than in the past; and virtually no scrap belts result. This is so because of several reasons; the gap between the belt and the plate permits visual alignment of the belt so that all elements are correctly arranged; and the effect of pressure of the mold cavity upon the belt body is minimized by this gap. Further, it has been found that when the agent 17 is placed in the compression section 13 of the belt 10 and adjacent the bottom wall of the casing 16, the resulting blown sponge cushion material 24 tends to retard cracks in the bottom of the belt 10. Therefore it can be seen that an improved method has been provided for making transmission belts or the like without requiring expensive hydraulic presses as in the past and wherein the resulting transmission belt eliminates many of the disadvantages of the prior known transmission belts.

Figure 5:
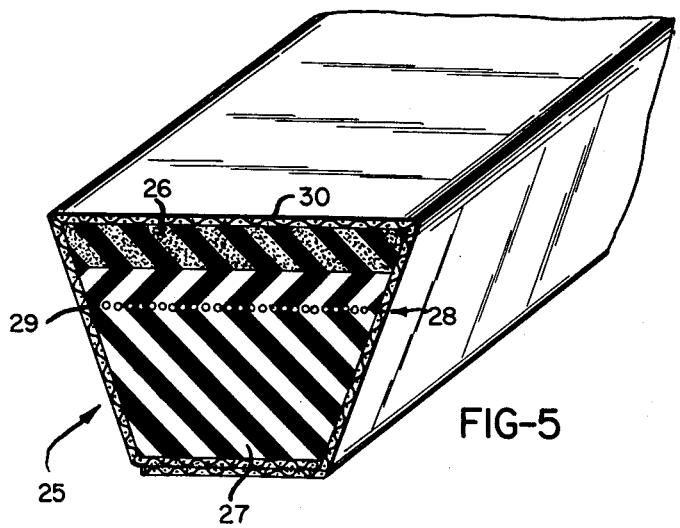
FIGURE 5 is a view similar to FIGURE 1 illustrating a further form of the invention.

While the transmission belt 10 of this invention has been illustrated as having the blown material 24 located in the compression section 13, it is to be understood that the blowing agent could be placed in the tension section as well. A belt in which the tension section has been blown is illustrated in FIGURE 5, and is designated by reference numeral 25. This belt is similar to belt 11, and consists of tension section 26, compression section 27, a neutral section 28 having reinforcing cords 29, and a stretchable outer cover 30. The blowing agent has been milled into the tension section of this belt and cured exactly as previously described. The outer or tension section is now of a blown sponge rubber, but the finished belt is otherwise the same as belt 10.

Figure 6:
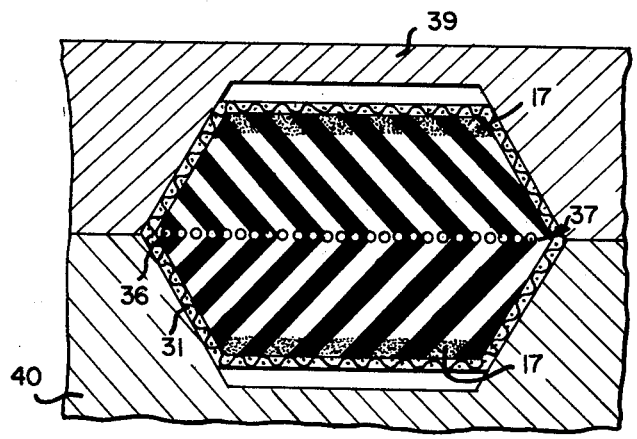
FIGURE 6 is a view similar to FIGURE 2 illustrating still another form of the invention.
Figure 7:
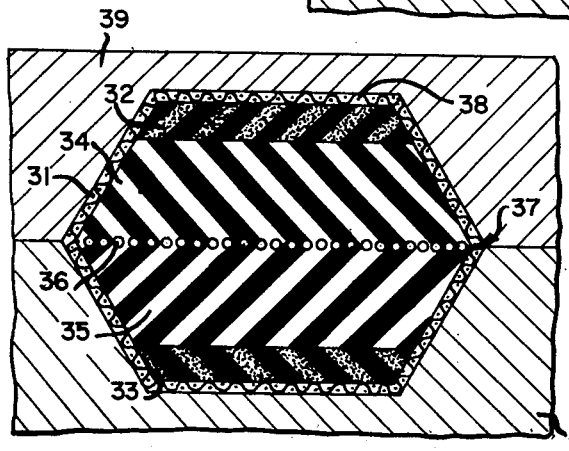
FIGURE 7 is a view similar to FIGURE 3 illustrating another step in the method of FIGURE 6.

Still another form of the invention is illustrated in FIGURES 5, 6 and 7, in which a belt 31 having a double truncated V cross section is illustrated. The belt referred to, known as a double-V belt, is of the configuration generally described in United States Patent No. 2,296,740. In this case, the belt consists of central strength section having sections 32 and 33 which may be considered as either tension or compression sections, depending on the relationship of the belt to the pulley. At the center of the belt is the neutral section 36, comprising strength cords 37; between the neutral section and section 32 is a main body section 34, while between the neutral section and section 33 is another main body section 35. A stretchable fabric cover 38, similar to cover 16, envelops the belt. In this case, the sections 32 and 33 are of blown sponge rubber, having been formed by milling a blowing agent into these sections, then exposing the belt to curing as previously described. The apparatus by which this belt is cured is similar to apparatus 18, except that the central body 40 and the movable cover 39 of the mold have cavities which represent a half-section of the belt. When the cover is closed on the main body as shown, the belt body does not quite fill the cavity, as gaps are left above and below the body as shown in FIGURE 6. This gap permits the cover to stretch when curing takes place and blows a portion of the rubber into sections 32 and 33.

Although the belt body described herein is shown to be undersized with respect to the mold cavities of the apparatus, it is to be understood that the body can originally have the same size as the mold cavities whereby the resulting bodies will still have the same size as the mold cavity even though the belts are provided with internal forces during the curing operation thereof in the above manner. However, it can be seen that by making the bodies initially smaller than the mold cavities, the bodies can vary within very liberal limits and the resulting belts will all be substantially uniform as the same will be stretched to completely fill the mold cavities during the curing operation. As a result, the manufacturing tolerances of the bodies need not be as tightly controlled as in the past.

It can be seen that this invention provides an improved transmission belt or the like, as well as an improved method for making the transmission belt or the like without requiring expensive apparatus or requiring unnecessary trimming or scrapping operations. Other forms are also contemplated as within the spirit of the invention.

I claim:
1. A transmission belt comprising a tension section, a compression section, and a neutral axis section, all enclosed by a stretched cover, a portion only of said compression section consisting of blown elastomeric material.
2. A transmission belt comprising a tension section, a compression section, and a neutral axis section, all enclosed by a stretched cover, a portion only of said tension section consisting of blown elastomeric material.
3. A double-V transmission belt having a central strength section, and a neutral axis section lying in a central plane, and a stretched cover enclosing said strength section, a portion only of said strength section on either side of said neutral axis section consisting of blown elastomeric material.
4. The method of making a transmission belt having a body formed of compression, tension and neutral axis sections, comprising the steps of placing a cover about said body, adding a blowing agent to said body adjacent said cover, and heat curing said belt to blow a limited portion of said body to expand and stretch said cover.
5. The method of claim 4 in which said blowing agent is located in the compression section.
6. The method of claim 4 in which said blowing agent is located in the tension section.
7. The method of making a double-V transmission belt having a body with a neutral axis lying in a central plane, comprising the steps of placing a cover about said body, adding a blowing agent to said body at both sides of said neutral axis, and heat curing said belt to blow a limited portion of said body at both sides of said neutral axis to expand and stretch said cover.
8. A transmission belt comprising a tension section and a compression section consisting of elastomeric material and enclosed by a stretched outer cover, a portion only of one of said sections consisting of blown elastomeric material.

References Cited in the file of this patent
UNITED STATES PATENTS

| | | |
|---|---|---|
| 1,998,817 | Meyer | Apr. 23, 1935 |
| 2,073,668 | Wilson | Mar. 16, 1937 |